United States Patent [19]

Callahan et al.

[11] 4,369,121

[45] Jan. 18, 1983

[54] METHOD AND COMPOSITION FOR THE CONTROL OF DUST

[75] Inventors: Joseph W. Callahan, Friendswood; Roy M. Christoffel, Dickinson; Jack W. Horvath, Houston, all of Tex.

[73] Assignee: Browning-Ferris Industries, Inc., Houston, Tex.

[21] Appl. No.: 274,745

[22] Filed: Jun. 18, 1981

[51] Int. Cl.$^3$ .............................................. C11D 9/42
[52] U.S. Cl. ...................................... 252/88; 252/558; 252/173; 252/DIG. 14; 252/DIG. 2; 252/DIG. 15; 404/76; 299/12
[58] Field of Search ........ 252/88, DIG. 15, DIG. 14, 252/DIG. 2, 173, 558; 404/76; 299/12

[56] References Cited

U.S. PATENT DOCUMENTS 3,549,542 12/1970 Holderby .................... 252/DIG. 14
4,269,723 5/1981 Barford et al. ................. 252/174.17

FOREIGN PATENT DOCUMENTS

| 2703505 | 2/1976 | Fed. Rep. of Germany . |
| 2717330 | 4/1976 | Fed. Rep. of Germany . |
| 2914960 | 4/1977 | Fed. Rep. of Germany . |
| 2305482 | 3/1975 | France . |
| 1534641 | 5/1977 | United Kingdom . |
| 271467 | 3/1968 | U.S.S.R. . |
| 498331 | 1/1974 | U.S.S.R. . |

*Primary Examiner*—John E. Kittle
*Assistant Examiner*—Hoa Van Le
*Attorney, Agent, or Firm*—Pravel, Gambrell, Hewitt, Kirk & Kimball

[57] ABSTRACT

An aqueous solution containing a cellulose ether in an amount of from about 0.25 to about 2.0% by weight and a wetting agent of from about 0.10 to about 0.5% by weight is described. The solution may be applied to stockpiles of aggregate materials at a rate of from about 0.05 to about 0.20 gallons per square foot of surface area to control the release of dust therefrom when subjected to high winds.

6 Claims, No Drawings

METHOD AND COMPOSITION FOR THE CONTROL OF DUST

BACKGROUND OF THE INVENTION

Many industrial facilities which use coke, coal, sand or other loose aggregate material must, in order to ensure that adequate supplies are always on hand for use, stockpile large inventories of such materials. This method of open stockpile storage creates the problem of atmospheric pollution by wind-borne fine aggregate particles. Additionally, working piles near processing equipment are disturbed daily due to use of material from these piles and creation of new piles. For example, in steel mills, coal piles are reduced daily for conversion to coke and, in turn, new coke piles are created. The problem has become so acute that several jurisdictions are now proposing or have instituted particle pollution standards with which stockpilers of such materials as coke, coal, sand or the like must comply. To comply, industrial users of such materials must treat open stockpiles to reduce the release therefrom of fine particulate matter as wind-borne pollution. One recently proposed regulation by the Environmental Protection Agency requires stockpilers of coal and coke to so treat the material as to withstand a wind force of 40 miles per hour.

Asphaltene-based dust control agents have been employed since as early as the late forties to control dust release from such materials. However, with the continuing rise in petroleum prices, the use of petroleum-based dust control agents is becoming or has become economically unattractive for large scale use. In addition, petroleum based dust control agents introduce air pollutants to the atmosphere during thermal operations performed on coke or coal that has been treated with such agents, hence making them more undesirable. Possible carcinogens could be produced from such petroleum-based dust control products.

It has become increasingly important to discover alternative non-petroleum-based dust control agents. However, despite the demand for such agents there has, so far as known, been no disclosure in the art of an economical non-petroleum-based agent which will effectively and economically control the release of fine aggregate particles from aggregate stockpiles, especially stockpiles of coal, coke or the like.

SUMMARY OF THE INVENTION

It has now been discovered that an aqueous solution containing a cellulose ether in an amount of from about 0.25 to about 2% by weight and a wetting agent in an amount of from about 0.10 to about 0.5% by weight when uniformly distributed over the surface of a stockpile of loose aggregate material at an application rate of from about 5 to about 20 square feet per gallon of solution effectively reduces the escape of fine aggregate particles therefrom.

DESCRIPTION OF THE PREFERRED EMBODIMENTS

This invention relates to a method of, and solution for, treating stockpiles of loose aggregate material to reduce the release therefrom of fine aggregate particles to the atmosphere. The method comprises applying to the surface of such aggregate material an aqueous solution containing from about 0.25 to about 2% by weight of a hydroxyalkylmethylcellulose and form about 0.10 to about 0.5% by weight of a wetting agent. Preferably, the dust control solution is applied to the stockpile material at an application rate of from about 0.05 to about 0.20 gallon per square foot of surface area. Such treatment coats the aggregate material causing fine aggregate particles to agglomerate and creates a barrier coating on the stockpile surface which stabilizes it against the release of fine particles or dust to the atmosphere.

In accordance with this invention, the dust control solution may be formulated in a concentrate form and diluted with water at the work site to give the desired working concentration of hydroxyalkylmethylcellulose for effective stockpile treatment. Initial formulation in concentrate form has the advantage of reducing manufacturing, storage and transportation costs.

The agent which has been found effective to produce an agglomeration of fine particles and provide a barrier coating to the stockpile is a cellulose ether such as a hydroxyalkylmethylcellulose. Preferably, the alkyl portion of the hydroxyalkylmethylcellulose is a lower alkyl having from about 2 to about 5 carbon atoms and may comprise a branched or straight-chain alkyl. Further, it is preferable that the hydroxyalkylmethylcellulose have a viscosity, measured at 2% aqueous concentration at 20° C., of from about 2,000 to about 5,000 cps. and most preferably about 4,000 cps.

The preferred cellulose ethers are hydroxypropylmethylcellulose and hydroxybutylmethylcellulose with hydroxypropylmethylcellulose being the most preferred. Hydroxypropylmethylcellulose and hydroxybutylmethylcellulose are commercially available from Dow Chemical Company and are marketed under the trademark name of METHOCEL. They are generally available in powder or granular form and are readily water soluble.

Preferably, a wetting agent is incorporated in the dust control solutions of this invention to ensure that the hydroxyalkylmethylcellulose agent will become uniformly dispersed over the surface of the aggregate material and to wet any slightly oily particles that may exist.

The incorporation of a wetting agent is particularly preferred for dust control solution designed for application to coal or coke piles, since the particles of such materials may be slightly oily. Even when the material to be treated, such as sand, is not expected to present any dispersal problem, a wetting agent is still preferred since it permits a smaller quantity of dust control agent to be used for effective treatment. Any nonionic, cationic or anionic wetting agent that is stable in the cellulosic compound may be used in the dust control solutions of this invention. Preferred wetting agents are ethylene oxide condensates of nonyl- or octylphenol, ethylene oxide condensates of straight chain alcohols, fatty acid amides, quarternary ammonium compounds, organic phosphate esters, alkali metal or amine neutralized dodecybenzene sulfonic acids or of linear alkylate sulfonic acids, and a modified coconut diethanolamide.

Examples of suitable wetting agents from the nonionic agents comprising ethylene oxide condensates of nonyl- or octylphenols are nonylphenoxypolyethoxyethanol containing 9–10 moles of ethylene oxide, iso-octylphenoxypolyethoxyethanol containing 10 moles of ethylene oxide, and octylphenoxypolyethoxyethanol containing 12–13 moles of ethylene oxide. Such agents are commercially availabe from Rohm & Haas Company under the trade names of Triton N-101, Triton X-100, and Triton X-102, respectively. The nonylphenol adducts of ethylene oxide are sold by Texas Chemical Company under their trademark SURFONIC ®. Examples of a suitable anionic agent is the sodium salt of linear alkylate sulfonic acid marketed by Witco Chemical under the trademark of SULFRAMIN ® 45 LIQUID.

To reduce the amount of processing time necessary to formulate the concentrate dust control solution, after addition of the wetting agent, hydroxyalkylmethylcellulose is dissolved in a portion of water which comprises about 50% of the total water volume of the final concentrate solution. While the hydroxyalkylmethylcellulose is being dissolved, the water is maintained at a temperature of about 160°–190° F. to assist solution. After solvation, additional water, which may be at room temperature or even ice water, is added to produce a final concentrate solution containing from about 5 to about 10% by weight hydroxyalkylmethylcellulose and from about 2 to about 5% by weight wetting agent.

The concentrate solution may thereafter be transported to the work site and diluted with from about 2.5 to about 20 parts water to produce a working solution ready for application to loose aggregate material as a barrier coating. Final dilution with water produces a working solution containing from about 0.25 to about 2% by weight hydroxyalkylmethylcellulose and from about 0.10 to about 0.50% by weight wetting agent. The precise final concentration of the working solution depends on the material to which the barrier is to be applied. Finely divided aggregate materials would require an application of a dust control solution having the active agent in the higher concentration range while coarsely divided aggregate material may be adequately treated with a solution wherein the active ingredient is in the lower concentration range. For the majority of materials to be treated, dust emission may be adequately controlled by application of a solution which contains the hydroxyalkylmethylcellulose in the range of from about 0.75 to about 1.50% by weight and a wetting agent of from about 0.25 to about 0.40% by weight.

Dust emission from an aggregate pile may be effectively reduced or controlled by applying the working solution uniformly about the surface area of the aggregate at an application rate of from about 0.05 to about 0.20 gallons per square foot of surface area. Although the working solution may be applied at application rates exceeding 0.20 gallons per square foot, higher application rates are generally not required. When the concentrate solution is diluted, the working dust control solution may be applied by conventional spreader equipment. Standard spreader trucks or hand sprayers can be used for applying the dust control solution. The solution is generally applied at pressure sufficient to generate the application rates in convenient time. Since the depth of surface penetration by the dust control solution is determined by the amount of fluid applied, and the thickness of the coating is determined by the concentration of hydroxyalkylmethylcellulose in the working solution, the dilution ratio and application rate can be varied to accommodate any range of atmospheric conditions or size and shape of pile to which the aggregate material may be subjected.

The dust control solutions of this invention are non-corrosive and non-toxic. These solutions may be safely handled without the necessity for special safety equipment. Application to stock piles of coke, sand, or coal stabilizes such material against particulate release upon exposure to wind gusts of over 40 miles per hour.

This invention will be further demonstrated by the following examples which are offered for purposes of illustration and not limitation of the instant invention. It will be apparent that the dust control agent of this invention is useful to control dust from other materials than those exemplified, such as, for example, coke, uranium and other mined ores and the like.

EXAMPLE 1

Eight conical piles of #4 blasting sand were placed on a smooth surface. Each pile comprised approximately 100 pounds of sand and was formed with a base diameter of about 24 inches and a height of about 12 inches. Each pile had an exposed surface area of approximatey 4.5 square feet.

One of the piles was left untreated as a control. Seven of the piles were treated with a dust control composition of the invention. The concentrate dust control composition used comprised a master batch containing 5% by weight of hydroxypropylmethylcellulose. The master batch was diluted with water prior to being applied to the sand piles in order to provide working solutions of 0.5% and 1.0% by weight hydroxypropylmethylcellulose. Approximately 0.375 gallons of the working dust control solution was applied to the exterior of each pile using a hand held sprayer. In each case, the solution was applied to each pile (some being treated with the 0.5% solution and the remainder being treated with the 1.0% solution) at the same spray pressure using a hand held sprayer. The sand piles treated with the 0.5 and the 1.0% by weight working dust control solutions were allowed to dry for about 3 hours in sunlight.

After drying, a pneumatic conveying system having an anemometer at the air discharge of the system was operated at an rpm speed to produce a 40+ miles per hour wind from a 6 inch hose. The hose was held approximately 4 inches from the surface of each of the sand piles and was moved to permit the discharged air to contact the entire pile surface area. The air discharge from the pnuematic conveying system produced dust from the sand and particles of the control (untreated) pile. When the air discharge was directed in a like manner against the piles treated with the 0.5 and the 1.% by weight dust control solution no dust or particulate matter was dislodged from the treated piles by the 40 mile per hour wind. Upon inspection, the surface area of the treated piles showed a tight, crusty, adherent film of the dust control agent. Thereafter, to test for water resistance, water was sprayed on the treated piles using the same hand held sprayer. Each of the treated piles were exposed to a water spray for the same amount of time and at the same water pressure. After water treatment an inspection showed only a very slight solution of the barrier coating on each pile.

EXAMPLE 2

The test as described in Example 1 was reproduced at a steel mill using fine coal dust piles instead of blasting sand. Initially, coal dust piles were treated with a dust control solution that did not have a wetting agent incorporated therein. It was readily apparent upon such treatment that satisfactory spreading of the dust control agent had not been achieved. Thereafter, the test was repeated and a wetting agent comprising a modified coconut diethanolamide was added to the dust control solution to the extent of about 0.10% by weight. Several piles of fine coat dust (24 inch base, 12 inches in height, approximately 4.5 square feet surface area) were treated with a working dust control solution. Several piles were treated with a solution comprising 0.5% by weight hydroxypropylmethylcellulose and 0.1% by weight wetting agent and several other piles were treated with a solution comprising 1.0% by weight hydroxypropylmethylcellulose and 0.10% by weight wetting agent. About 0.375 gallons of dust control solution was applied to each pile by a hand held sprayer. Each of the treated coal piles showed a tight, crusty, adherent film on the exterior surface and when exposed to a 40+ mile per hour wind no dust or aggregate particles were released. The adherent film on the coal dust piles also showed excellent resistence to water wash-out under a mild rain condition.

From the foregoing description of this invention, many variations will be apparent to those of ordinary skill in the art without departing from the scope of the invention as set forth in the appended claims.

We claim:

1. A method for reducing the escape of fine aggregate particles from the surface of loose aggregate materials comprising the step of applying to the surface of the aggregate material a uniformly dispersed aqueous solution consists essentially of from about 0.25 to about 2% by weight hydroxyalkylmethylcellulose wherein the alkyl group has from about 1 to about 5 carbon atoms and water.

2. The method of claim 1, wherein the aqueous solution also contains a wetting agent in an amount of from about 0.10 to about 0.5% by weight.

3. The method of claim 2, wherein the aqueous solution is applied to the surface of the aggregate material at the rate of from about 0.05 to about 0.20 gallon per square foot of surface area.

4. The method of claim 3, wherein the hydroxyalkylmethylcellulose is hydroxypropylmethylcellulose.

5. The method of claim 3, wherein the wetting agent is an ethylene oxide condensate of nonylphenol, ethylene oxide condensate of octylphenol, ethylene oxide condensate of a straight chain alcohol, a fatty acid amide, a quarternary ammonium compound, an alkali metal or amine neutralized dodecylbenzene sulfonate or a modified coconut diethanolamide.

6. The method of claim 2, wherein the hydroxylalkylmethylcellulose is a hydroxypropylmethylcellulose having a viscosity of from about 2,000 to about 5,000 cps. when measured as a 2% aqueous solution at 20° C. and wetting agent is a modified coconut diethanolamide.

* * * * *